(12) United States Patent
Ferren et al.

(10) Patent No.: US 8,952,798 B2
(45) Date of Patent: *Feb. 10, 2015

(54) CUSTOMIZABLE AND RECONFIGURABLE VIRTUAL INSTRUMENT PANEL

(71) Applicant: Applied Minds, LLC, Glendale, CA (US)

(72) Inventors: Bran Ferren, Beverly Hills, CA (US); W. Daniel Hillis, Encino, CA (US); Randall Adam Yates, Ventura, CA (US); Ira M. Lichtman, Simi Valley, CA (US); Clinton Blake Hope, Los Angeles, CA (US)

(73) Assignee: Applied Minds, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/761,044

(22) Filed: Feb. 6, 2013

(65) Prior Publication Data

US 2013/0147772 A1 Jun. 13, 2013

Related U.S. Application Data

(60) Continuation of application No. 13/462,687, filed on May 2, 2012, now Pat. No. 8,384,536, which is a division of application No. 12/422,793, filed on Apr. 13, 2009, now Pat. No. 8,198,994.

(51) Int. Cl.
*B60Q 1/00* (2006.01)
*G06F 3/01* (2006.01)
*B60K 35/00* (2006.01)
*B60K 37/06* (2006.01)
*G09G 5/00* (2006.01)

(52) U.S. Cl.
CPC . *G06F 3/01* (2013.01); *B60K 35/00* (2013.01); *B60K 37/06* (2013.01); *G09G 5/00* (2013.01); *B60K 2350/1032* (2013.01)
USPC ...... 340/425.5; 340/3.32; 340/10.1; 340/971; 348/222.1; 348/441; 348/837; 455/414.1; 455/418; 455/151.1

(58) Field of Classification Search
CPC .................... G06F 2003/00; B60K 2350/1032
USPC .......... 340/425.5, 3.32, 10.1, 971; 348/222.1, 348/441, 837; 455/414.1, 418, 151.1
See application file for complete search history.

(56) References Cited

U.S. PATENT DOCUMENTS

| | | |
|---|---|---|
| 5,592,079 A | 1/1997 | Scheel et al. |
| 6,529,804 B1 | 3/2003 | Draggon et al. |
| 6,728,531 B1 | 4/2004 | Lee |
| 7,081,580 B2 | 7/2006 | Brinkman et al. |
| 7,233,779 B2 | 6/2007 | Mere et al. |
| 8,090,309 B2 | 1/2012 | Krampf et al. |
| 2009/0181662 A1* | 7/2009 | Fleischman et al. .......... 455/419 |

* cited by examiner

*Primary Examiner* — Tai T Nguyen
(74) *Attorney, Agent, or Firm* — Michael A. Glenn; Perkins Coie LLP

(57) ABSTRACT

The invention provides an instrument control panel that is easily customized and reconfigured, and yet provides the familiar tactile sensation of physical knobs, sliders, and buttons. The instrument control panel comprises one or more interface components that are removably coupled to an interface display wherein the interface components communicate with one or more control components disposed behind the interface display. The present invention lends itself particularly well to an instrument panel.

22 Claims, 8 Drawing Sheets

(Front)

(Rear)

CUSTOMIZABLE AND RECONFIGURABLE VIRTUAL INSTRUMENT PANEL

CROSS REFERENCE TO RELATED APPLICATIONS

This application is a continuation of U.S. patent application Ser. No. 13/462,687, filed May 2, 2012, now U.S. Pat. No. 8,384,536, which is a divisional application of U.S. patent application Ser. No. 12/422,793, filed Apr. 13, 2009, now U.S. Pat. No. 8,198,994, the entirety of both of which are incorporated herein by this reference thereto.

BACKGROUND OF THE INVENTION

1. Technical Field

The invention relates to the field of controlling a graphical user interface. Specifically, the invention relates to providing customizable and reconfigurable physical controls for controlling a graphical user interface.

2. Description of the Related Art

Modern media products have increasingly been designed to be digital. Likewise, the controls associated with digital media products have become increasingly sophisticated and their user interfaces have become more complicated. For example, it is sometimes difficult to locate and navigate media controls on modern media receivers.

The difficulty in navigating multimedia devices is compounded when one attempts to access a multimedia device in a vehicle. Averting one's eyes from the road and surrounding environment to access a complicated media user interface presents a significant danger to the driver and passengers, as well as to the occupants of other vehicles. These modern digital media devices do not provide adequate user-friendliness, such that a driver can access the full functionality of the device without averting his eyes from the road.

Instrument panels in modern vehicles have become increasingly crowded, often introducing an undesirable level of distraction to the driver. Despite this increasing level of sophistication, vehicles cannot easily be customized to an individual driver's tastes. Given the innate desire of humans to customize environments in which they live and work, this is a serious shortcoming.

To address these deficiencies, several automobile manufacturers have introduced glass cockpits, in which control interfaces are presented to the driver on touch screen surfaces, such as LCD displays. These systems allow the same dashboard real estate to be used for several different control interfaces. Each interface is displayed on an as needed basis, based on the context of the user interaction.

While the benefits this approach offer simplification and conservation of space within the dashboard, the interfaces presented are often not easily reconfigured by the end user. Furthermore, many individuals desire the haptic tactile sensation of more conventional analog media devices provided by actual needles, dials, and gauges. Many modern digital media devices do not provide the tactile sensation offered by physical control knobs, sliders, and buttons.

Several computer programs, such as LabView®, (manufactured by National Instruments, based in Austin, Tex.) allow a user to design customized interfaces by selecting knobs and sliders from a toolbox, placing them on a virtual instrument panel, and assigning the output of the knobs and sliders to other devices or functions. While such systems can be designed to be customizable, they still do not provide the tactile sensation of physical control knobs.

SUMMARY OF THE INVENTION

The invention provides an instrument control panel that is easily customized and reconfigured, and yet provides the familiar tactile sensation of physical knobs, sliders, and buttons.

Additionally, disclosed is a technique for customizing the look and feel of a vehicle instrument panel. The customization addresses both the specific functional needs and the personal tastes of particular passengers and drivers. More specifically, the invention offers the advantages of an LCD control panel, such as flexibility and easy reconfiguration, and provides the familiar look and feel of physical indicators.

It should be noted that while the advantages of the invention are most easily seen in the context of a dashboard instrument panel, it may be applied in other types of media interfaces, as well as other areas of a vehicle, such as in headrest displays and other rear-passenger consoles. Additionally, the invention is applicable to all types of vehicles including, without limitation, automobiles, boats, trains, airplanes and the like.

In some embodiments of the invention, a stand-alone instrument panel is provided with an interface display and one or more removable, customizable interface components. In some other embodiments, the instrument panel is integrated into other devices, vehicles, etc. In a presently preferred embodiment of the invention, the interface display is a liquid crystal display (LCD) screen.

In some embodiments of the invention, the interface components are magnetically and/or inductively coupled with one or more encoders through the interface display. According to some of these embodiments, such encoders are inductively powered by movement of a mechanism in the interface component and the encoder uses the induced power to generate a signal used to control a device. In other embodiments, the device is controlled by the interface components through the use of reflective sensors, Hall Effect sensors, or other position determination means now known or later developed.

In some embodiments of the invention, a grid of encoders is provided with a backing that can be coupled with the interface display, such that one or more interface components are removably coupled to the front side of the interface display and used to control a function of a corresponding device.

In some embodiments, the interface display and the interface components control a multimedia/audiovisual device. In other embodiments, the interface display and the interface components control a Global Positioning System (GPS) apparatus. In yet other embodiments, the interface display and the interface components control a hybrid apparatus, including both an audiovisual device and a GPS apparatus. Although specific uses are provided, it will be readily apparent to those with ordinary skill in the art having the benefit of this disclosure that a wide variety interfaced devices, now known or later developed, could be equally be controlled using the removable and customizable interface components according to the invention.

In some embodiments, the interface components comprise buttons, sliders, and/or other known tactile interface components. In the presently preferred embodiment, the reconfigurable and customizable interface is integrated into the dashboard of a vehicle. However, it will be readily apparent that other locations within a vehicle are equally applicable.

In some embodiments of the invention, one or more prepackaged or custom skins are provided for the interface display. According to these embodiments, the skins ideally represent status attributes of the controlled device and/or the proper placement area for an interface component. Such skins can also designate user affinity to an organization or may include advertising.

DETAILED DESCRIPTION OF THE INVENTION

The invention comprises a user interface that is easily customized and reconfigured, and yet provides the familiar tactile feel of physical knobs, sliders, and buttons. The user interface comprises one or more interface components that are removably coupled to an interface surface. The interface components communicate with one or more control components disposed behind the interface surface. In some embodiments of the invention, the interface surface is substantially flat. In some embodiments the interface surface is passive, meaning it is not a display. In some other embodiments, the interface surface is further configured to display information. According to these embodiments, the interface displays information related to the function of the interface components. The invention lends itself particularly well to an instrument panel, for example in a vehicle, such as an automobile.

Customizable Instrument Panel

Figure 1:
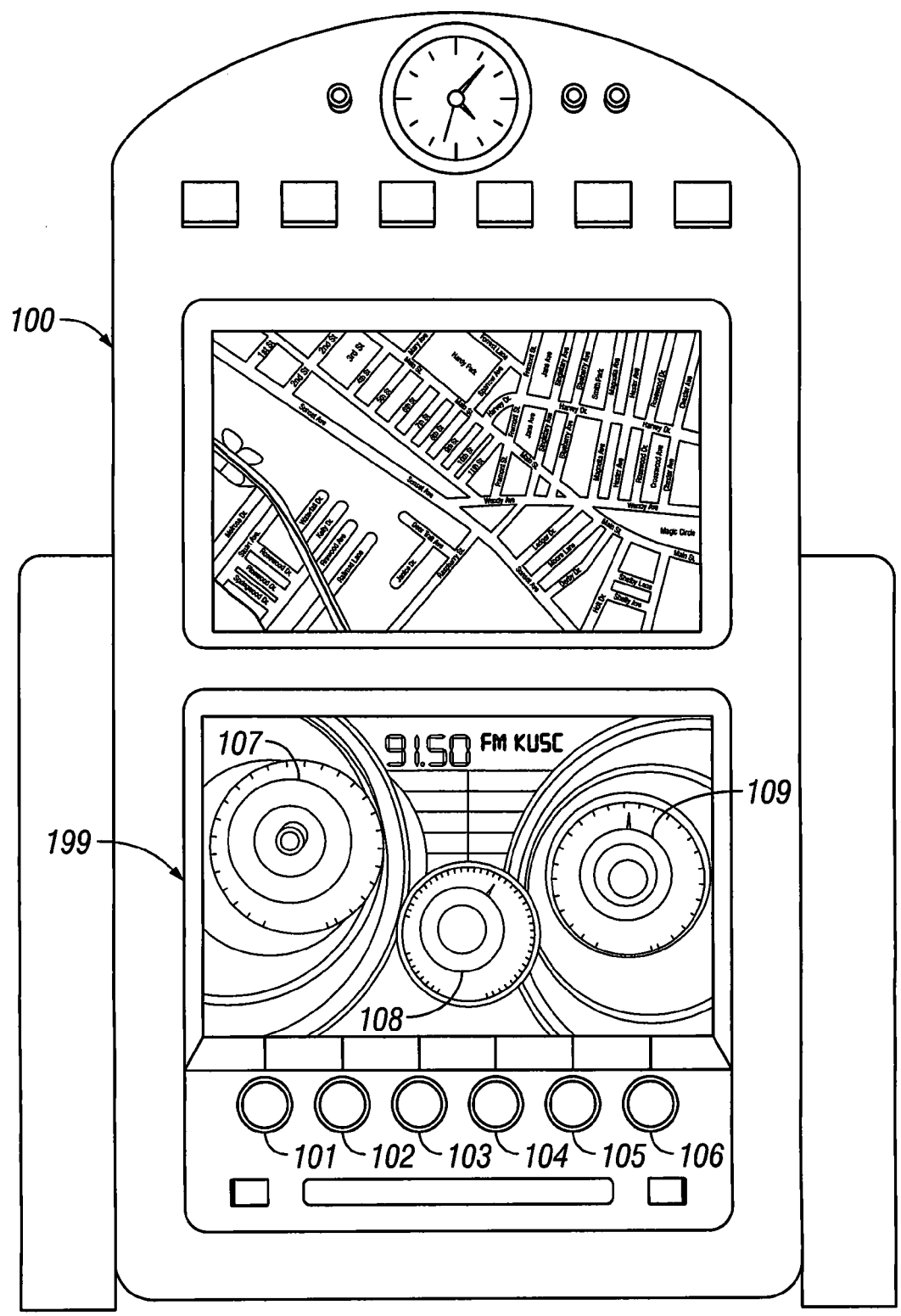
FIG. 1 is a schematic front view of a customizable and reconfigurable instrument panel according to some embodiments of the invention.

FIG. 1 illustrates the customizable and reconfigurable instrument panel according to some embodiments of the invention. FIG. 1 shows a media device 100 having an interface display 199 and a number of static interface components: 101, 102, 103, 104, 105, and 106. Customizable interface components 107, 108, and 109 are removably coupled to the interface. The removable interface components 107, 108, and 109 are configured to control one or more aspect of the media device 100. In some embodiments of the invention, the interface surface does not necessarily comprise a display.

In some embodiments of the invention, the media device 100 comprises a multimedia receiver that is coupled to an audiovisual output (not shown). According to these embodiments, the removable interface components 107, 108, and 109 control various functions of the multimedia device, e.g. volume, terrestrial radio tuning, satellite radio tuning, balance, frequency response, etc.

The removable interface components 107, 108, and 109 are depicted as knobs. However, it will be readily apparent to those having ordinary skill in the art having the benefit of this disclosure that a number of other interface components are equally applicable. For example and as explained below, slider and button interface components are especially applicable and useful in some embodiments of the invention.

In some embodiments of the invention, the user interface components 107, 108, and 109 are positioned by the end user in a desired location on a media device interface display 199. The interface display 199 may be chosen from among standard structural materials such as, for example, aluminum, stainless steel, or plastic. In the presently preferred embodiments, the interface display 199 is a liquid crystal display (LCD).

In the case of interface display 199 as an LCD, a number of labels and/or other identifying and instructive information for the interface components 107, 108, and/or 109 may be added by the user through an input (not shown) or may be preloaded in the form of one or more skins (explained below). For example, when coupling an individual component 107, a prompt is automatically displayed on the interface display 199 which requests that the user chose a function for dedicating to that component 107, for example volume control. By choosing the volume control, the user dedicates that component 107, to volume control and the word "Volume" is preferably displayed next to the component 107.

In some other embodiments, the components 107, 108, and/or 109 automatically communicate a dedicated function to the display 199, such that the display automatically depicts its function on the LCD when it is coupled with the interface display 199.

The interface components control a particular function and/or an auxiliary component of the media device. In some embodiments of the invention, positional data is output from the interface component and is communicated to the device. The positional data is then translated into a signal that is used to control the particular device or function. For example, a scalar value representing the absolute angular position of a knob within its rotational range is detected and is then associated with a particular device or function. Various means for the determination of interface component position are explained below.

Referring again to FIG. 1, the customizable interface components 107, 108, and 109 are secured against the interface display surface, preferably by magnets (not shown). Specifically, the interface components 107, 108, and 109 are visible and accessible to the end user on the user side of the interface display surface 199 and are each matched by a magnetically attracted control component on the backside of the interface display surface 199.

Determination of Interface Component Position

The angular position of a knob, or linear position of a slider, may be determined in any of several different ways. For example, a grid of sensors and a set of reflective markings can be used to determine the position of the interface components. According to these embodiments, a set of sensors are positioned around the perimeter of the interface display surface. Additionally, the interface components include a set of reflective marks used by the sensors. The sensors detect the position of markings placed on the edges of the interface components. For example, markings reflective at IR wavelengths may be applied to the perimeter of a knob and, when illuminated by IR emitters proximal to the sensors, used to determine the angular position of the knob. Patterned markings (e.g. variations in spacing or thickness) can uniquely identify the knob from among other knobs on the interface display surface.

Alternatively, the position of an interface component can be determined by the interface display surface directly. For example, the information gathered by the scanning elements within an optical scanning display can be analyzed to determine the translational and rotational position of a knob based on patterned markings on the surface of the knob closest to the display. An example of such an optical scanning display is achieved by a compact multi-touch panel developed by Sharp Electronics Corporation, located in Romeoville, Illinois, the panel having an approximate 1-mm depth with an optical sensor integrated into each pixel.

In some other embodiments, one or more pairs of orthogonal Hall effect sensors may be placed within a control component located behind the interface display surface, and a magnet may be placed within an interface component. The magnet within the interface component produces a magnetic field that varies as the interface component is rotated or otherwise displaced. The orthogonal sensors measure these variations in the magnetic field to determine the orientation of the magnet and therefore the rotational position of the knob. According to these embodiments, the determined position of each knob is preferably transmitted wirelessly back to a processor or directly to the associated device or function. Various means for wireless communication include, but are nor limited to an RF signal, an IEEE 802.11 protocol signal and a Bluetooth® signal.

In some embodiments of the invention an LCD is used as the interface display surface. The LCD displays a regular pattern beneath the knob, which can be analyzed by an optical sensor within the knob to determine the knob's angular position, using techniques similar to those used by optical mice. According to these embodiments, the determined position of each knob is preferably transmitted wirelessly back to a processor or directly to the associated device or function.

While explicit examples of position determination means are provided, it will be readily apparent to those with ordinary skill in the art having the benefit of this disclosure that a wide variety of position determination means, now known or later developed, could be equally applicable to yield same or similar results.

Additionally, in some embodiments, the mechanical rotation of the knob by a user generates inductive power for one or more optical encoders located in the control component that is behind the control panel surface. A voltage is induced that is used to power an encoder. The encoder then determines the rotational position of the knob. According to these embodiments, the determined position of each knob is preferably transmitted wirelessly back to a processor or directly to the associated device or function.

Figure 2A:
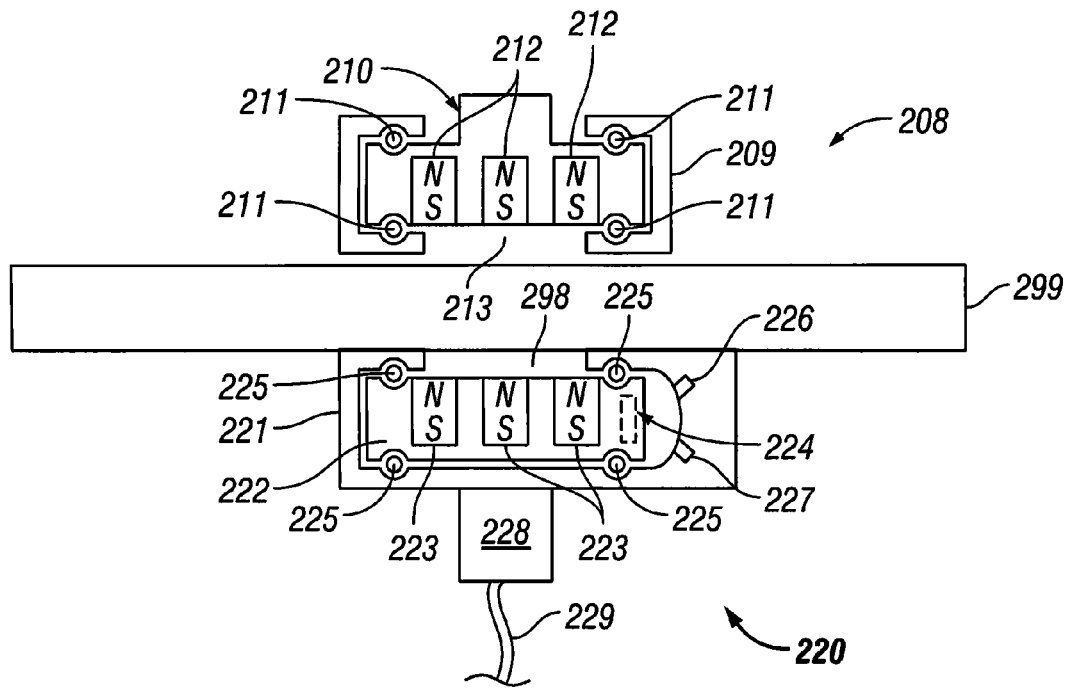
FIG. 2A is a schematic side view of a knob apparatus according to some embodiments of the invention.

FIG. 2A is a schematic side view of a knob apparatus 208 removably and magnetically coupled to an interface display 299, as well as a corresponding encoder apparatus 220 that is positioned on the opposite side of the interface display 299. According to some embodiments, the knob apparatus 208 comprises a knob 210 which rotates within a knob housing 209 within one or more bearings 211. One or more magnets 212 are disposed within the knob 210, such that the magnets 212 rotate with the knob 210. In some embodiments, the magnets 212 are mounted flush with the bottom surface of the knob 210. In some embodiments of the invention, the knob 210 and magnets 212 are disposed such that a gap 213 exists between the magnets 212 and the bottom surface of the knob 210 and the interface display surface 299. According to these embodiments, the movement of the knob 210 and the magnets 212 will not damage the interface display surface 299.

To further guard against damage to the interface display surface, some embodiments of the invention incorporate a transparent protective layer between the interface components and the interface display surface. For example, a thin acrylic or polycarbonate sheet can be affixed to the interface display surface. The sheet protects the potentially delicate surface (e.g., in the case of an LCD) from damage by contact from the moving surfaces and edges of the interface components. In those embodiments in which the interface display comprised an LCD, the sheet additionally mitigates impairments to the rendered image caused by compression of the liquid crystal material during operation of the interface components.

The encoder apparatus 220 is disposed opposite of the knob apparatus 208 through the interface display surface 299. The encoder comprises an encoder housing 221 that encases an encoder body 222 that has one or more magnets 223 disposed within. As shown, the magnets 223 are flush mounted in the encoder body 222. The encoder body 222 rotates within the encoder housing 221 within one or more bearings 225. Also on the encoder body 222 are encoder markings 224. An offset 298 is disposed between the magnets 223 and the interface display surface 299, such that the magnets 223 can not damage the interface display surface 299 as they move. In some embodiments, the magnets 223 are fully embedded within the encoder body 222 such that the gap 298 exists between the encoder body 222 and the interface display surface 299.

The knob apparatus 208 and the encoder apparatus 220 are configured such that the magnets 212 and 223 magnetically couple the knob apparatus 208 to the encoder apparatus 220 through the interface display surface 299. The magnets 212 also relay an angular displacement of the knob 210 to the encoder body 222 within the encoder apparatus 220. As such, the encoder markings 224 are displaced as the knob rotates.

Also within the encoder housing 221 are an emitter 226 and a detector 227. The emitter 226 and the detector 227 establish the position of the encoder body 222 by determining the position of the encoder markings 224.

In some embodiments of the invention, this position information is communicated through a housing shaft 228 to an umbilical cord 229 and to a processor (not shown). In some other embodiments, the position information is communicated wirelessly.

Figure 2B:
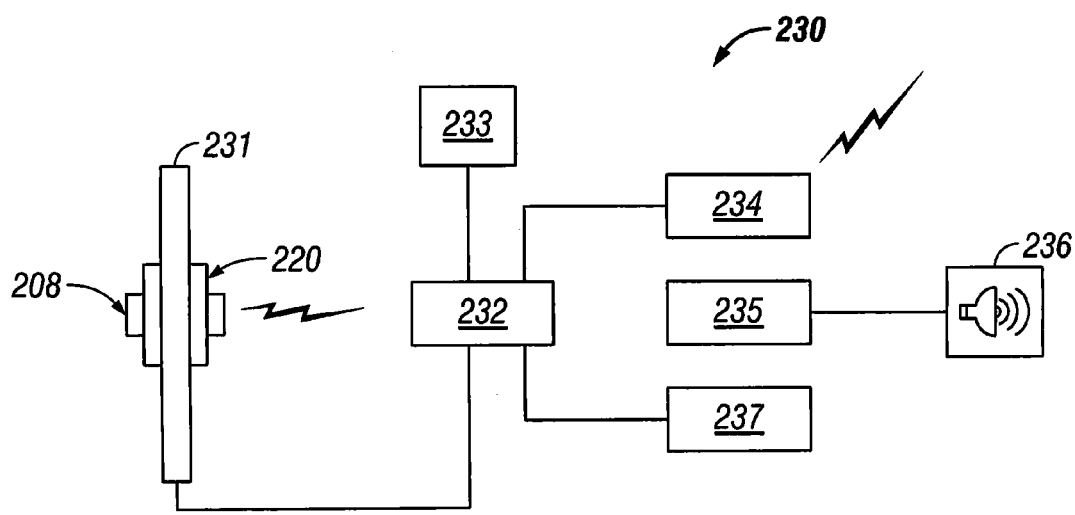
FIG. 2B is a schematic illustration of a processing circuit for an interface display according to some embodiments of the invention.

FIG. 2B is a schematic illustration of a processing circuit 230 for an interface display 231, including a knob apparatus 208 and an encoder apparatus 220 according to some embodiments of the invention. As explained above, the encoder apparatus 220 detects rotational information from the knob apparatus 208 and communicates it to a processor 232. As shown, the encoder apparatus 220 wirelessly communicates the knob apparatus' angular position to the processor 232. The processor 232 is coupled to a memory device 233, as well as various other audio/visual components such as a GPS receiver 234, a stereo receiver 235 having connected speakers 236, or an auxiliary component 237, among others now known or later developed. In some embodiments of the invention, the processor 232 is coupled directly to the interface display 231 for communicating display information.

Figure 2C:
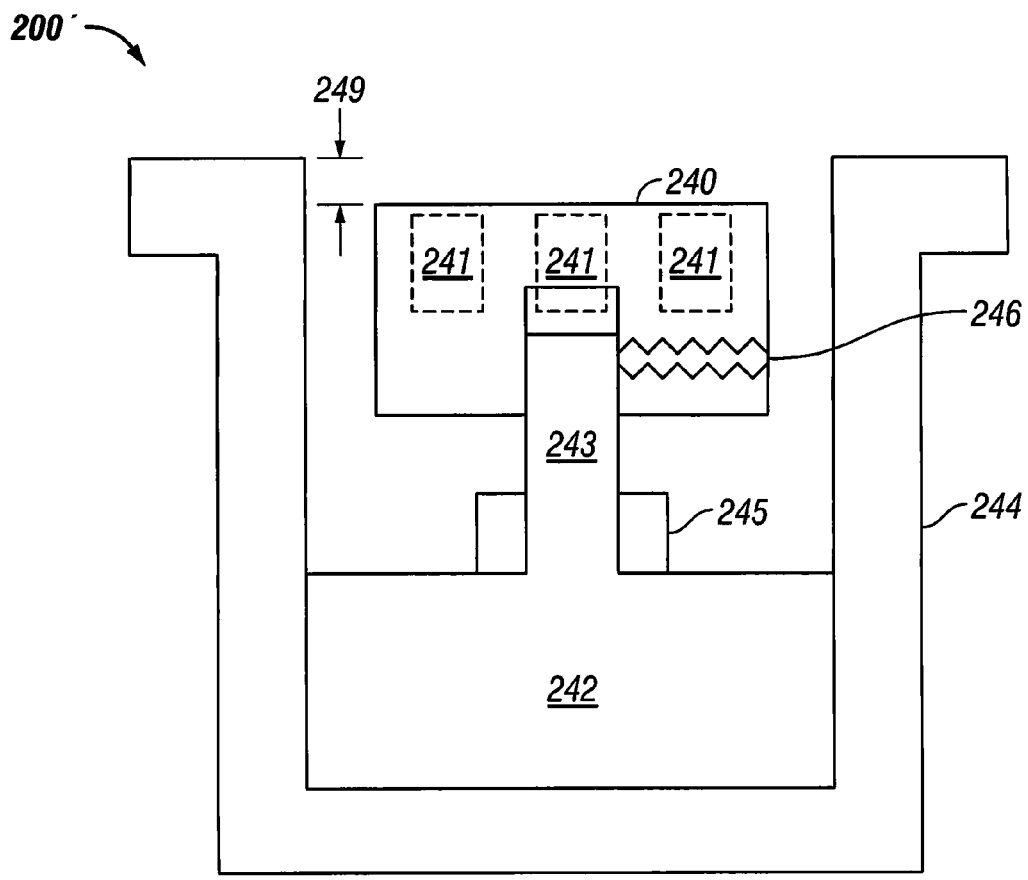
FIG. 2C is a schematic side view of an alternative encoder apparatus according to some embodiments of the invention.

FIG. 2C is a schematic side view of an alternative encoder apparatus 200' according to some embodiments of the invention. The encoder apparatus 200' comprises an encoder 242 housed within a bracket 244 and coupled to adapter 240 via a shaft 243. The shaft is fit with a bushing 245 and the adapter 240 is coupled to the shaft via a set screw 246. The adapter 240 is configured with a plurality of magnets 241 that magnetically couple with a corresponding knob apparatus (not shown). The encoder apparatus has an offset 249 such that the adapter 240 does not directly contact a display surface (not shown). According to these embodiments, the bracket 244 and adapter 240 can be retrofit to most any existing encoder apparatuses.

In those embodiments of the invention incorporating a rotating magnet placed behind the display, force feedback and/or damping sensations may be provided to the knob in front of the display. One method of providing damping comprises enclosing the knob or encoder body within a viscous fluid.

Specific Implementation of a Re-Configurable Interface

As explained above, the mechanical rotation of a knob by a user generates power that is provided to an optical encoder which is located behind the interface display. The positional information determined by the encoder is transmitted wirelessly back to a processor. In some embodiments, the encoder on the backside of the interface display may be connected to a power supply and a processor by an umbilical cord. The umbilical cord provides power to the encoder and carries the encoder measurements back to the processing unit.

Figure 3A:
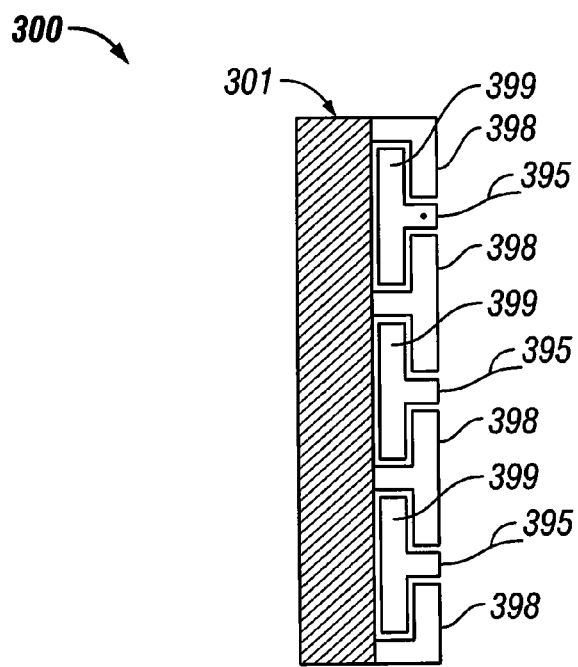
FIG. 3A is a schematic side view of a specific implementation of a reconfigurable interface display using a plurality of encoders, each coupled to an umbilical cord according to some embodiments of the invention.

FIG. 3A is a schematic side view of a specific implementation of a reconfigurable interface display 300 that uses a plurality of encoder apparatuses 399. The encoder apparatuses 399 are configured to couple with knobs (not shown) through the interface display 301 as explained above. Additionally, the encoder apparatuses 399 are kept in place against the interface display 301 using T-slots 398. The T-slots 398 keep the encoder apparatuses 399 from falling off the backside of the interface display 301 when the knob is removed. Each encoder apparatus 399 is coupled to an umbilical cord 395. In some embodiments, the T-slots extend into the page the whole width of the interface display. Additional T-slots (not shown) extend in the vertical dimension (between the bottom and top of the interface display) to create an intersecting grid of T-slots. According to these embodiments, the encoder apparatuses 399 (and therefore the corresponding knobs) can be moved around the interface display 301 in a two-dimensional grid pattern.

Figure 3B:
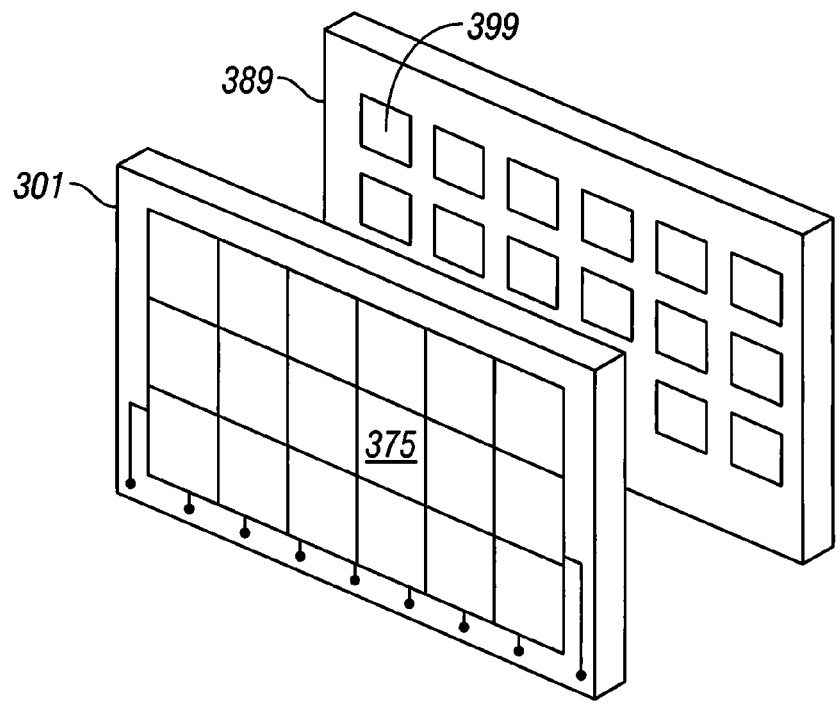
FIG. 3B is a schematic exploded isometric view of a reconfigurable interface display with a backing grid of encoders according to some embodiments of the invention.

FIG. 3B is a schematic, exploded isometric view of an interface display 301 having a backing grid of encoder apparatuses 389. According to these embodiments, a plurality of interface components (not shown) are removably coupled to the interface display 301 according to the pattern of the grid of encoder apparatuses 389, such that one or more individual encoder apparatuses 399 communicate rotational and/or other movement information to a processor (not shown). According to FIG. 3B, the interface display 301 comprises an LCD.

In some embodiments of the invention, the interface display 301 displays a representation of an empty grid of boxes 375. According to these embodiments, the empty boxes 375 indicate an available location for an interface component to be placed. In some embodiments, each box 375 is assigned with the ability to control one particular function. For example, a particular box 375 may be assigned with the ability to control the volume level of a multimedia device to which the control interface 301 is coupled. According to these embodiments, a prepackaged skin is displayed on the control interface 301 to indicate which box 375 controls which function.

Implementation Examples

Figure 4A:
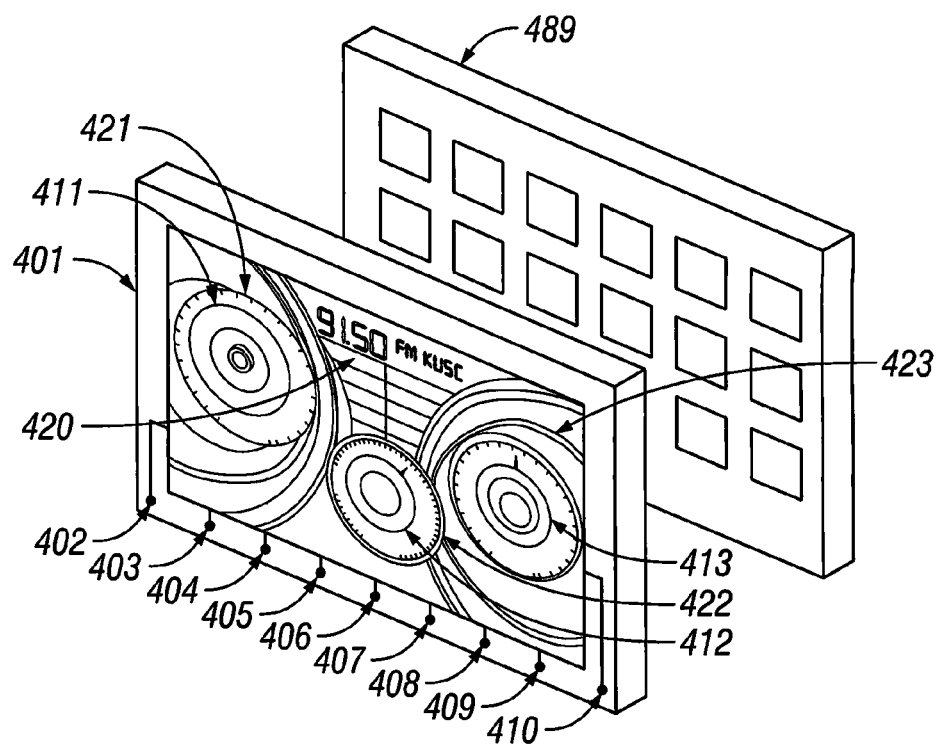
FIG. 4A illustrates a controllable interface display and a grid of encoders configured to control a radio according to some embodiments of the invention.
Figure 4B:
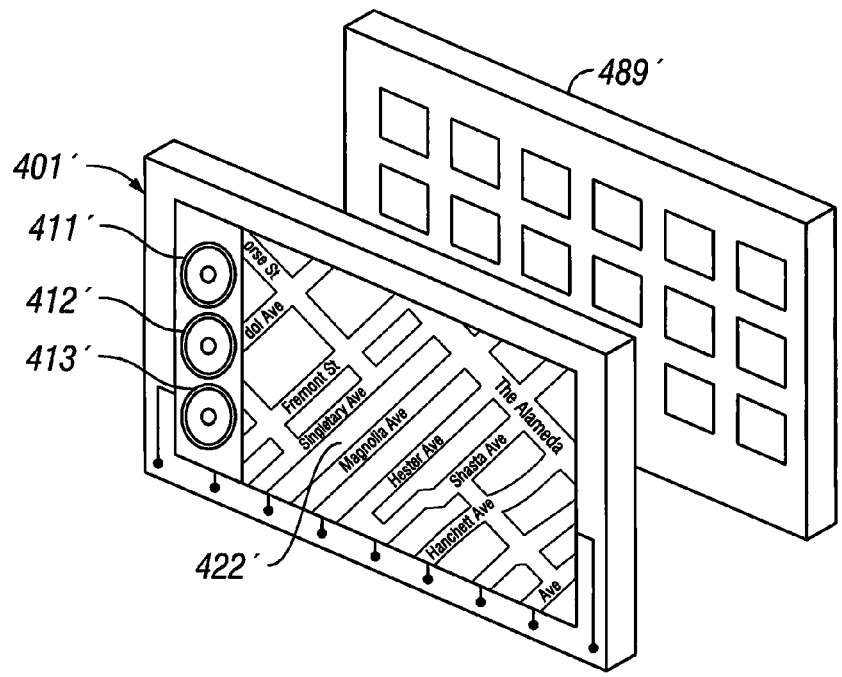
FIG. 4B illustrates another example of a controllable interface display for a GPS apparatus according to some embodiments of the invention.

FIGS. 4A and 4B illustrate two examples of customizable and reconfigurable virtual instrument panels that use a grid of encoders. FIG. 4A illustrates a controllable interface display 401 and a grid of encoders 489 that are configured to control a radio (not shown). The controllable interface display 401 includes a number of dedicated controls 402, 403, 404, 405, 406, 407, 408, 409, and 410 that control certain aspects of the radio. Furthermore, a number of interface components 411, 412, and 413 are removably coupled to the interface display 401. Each of these interface components 411, 412, and 413 can be configured to control another function of the radio. The interface display 401 also displays information 420 such as current radio station setting, and includes virtual level dials 421, 422, and 423 that are used to indicate a current position of the interface component 411, 412, or 413 within a function range. For example, as shown the information 420 indicates that the tuner is presently set to an FM station 91.50 MHz. Because the interface component 411 is presently dedicated to tune the radio station, an indication is shown on virtual level dial 421 at this point where the present station (91.50 FM) falls within the spectrum of available stations.

FIG. 4B illustrates another example of a controllable interface display 401' according to some embodiments of the invention. According to FIG. 4B, the controllable interface display 401' and corresponding grid of encoders 489' control the function of a global positioning system apparatus (GPS). As shown, the controllable interface display 401' displays a GPS map 422'. Furthermore, interface components 411', 412', and 413' are configured to control various functions of the GPS apparatus, such as panning, zooming, and rotating.

Although specific implementations are explicitly disclosed in FIGS. 4A and 4B, it will be readily apparent to those with ordinary skill in the art having the benefit of this disclosure that a wide variety of functions controlled through interfaces, now known or later developed, are able to take advantage of the present invention.

Examples of Specific Reconfigurable Interface Controls

Figure 5A:
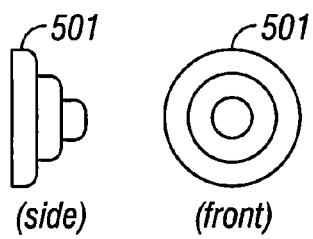
FIG. 5A illustrates a side and front schematic view of a knob according to some embodiments of the invention.

As explained above, reconfigurable knobs are used to control a device through an interface display surface. FIG. 5A is a side and front schematic view of a knob 501 according to some embodiments of the invention. The knob's 501 position is determinable via a variety of ways, as explained above. Other means for controlling a knob 501 will be readily apparent to those having ordinary skill in the art having the benefit of this disclosure.

Figure 5B:
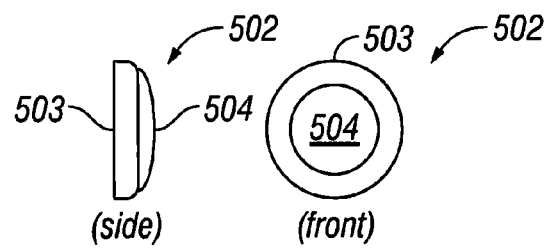
FIG. 5B illustrates a side and front view of a button according to some embodiments of the invention.

In some embodiments of the invention, one or more removable and reconfigurable buttons are used to control a device. FIG. 5B illustrates a side and front view of a button 502 according to some embodiments of the invention. The button comprises a base 503 and a substantially resilient depressible cover 504.

In some embodiments of the invention, the button 502 is implemented in conjunction with a transmitting and receiving antenna located within a control apparatus (not shown) on the backside of the display surface (not shown). The button comprises an LC circuit within the base 503 of the button on the front side of the display surface. The antenna transmits an RF signal at the resonant frequency of the LC circuit, thereby establishing a "ringing" within the LC circuit. The antenna is configured to listen to hear if the LC circuit is ringing. When the user presses the button 502, the LC circuit is shorted and no ringing is possible. If no ringing is heard by the antenna, the button 502 is determined to be depressed. The control apparatus then communicates that the button has been actuated to the device that the button is configured to control. Although a specific example of button control is explicitly disclosed, it will be readily apparent to those with ordinary skill in the art having the benefit of this disclosure, that numerous other button control implementations are able to be taken advantage of to yield similar results.

Figure 5C:
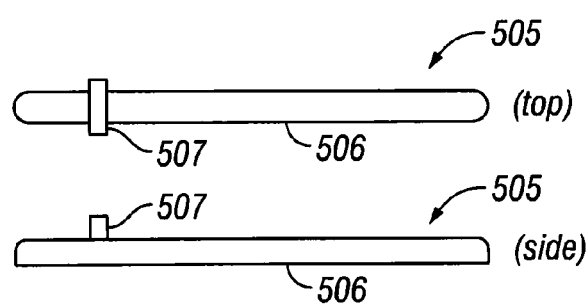
FIG. 5C is a schematic top and side view of a slider control according to some embodiments of the invention.

In some embodiments of the invention, a slider control is used as an interface component to control one or more device, such as a media device. FIG. 5C is a schematic top and side view of a slider 505 control according to some embodiments of the invention. The slider 505 comprises a base 506 and a sliding handle 507. In some embodiments of the invention, one or more sliders 505 are controlled with one or more encoders as explained below.

Figure 6A:
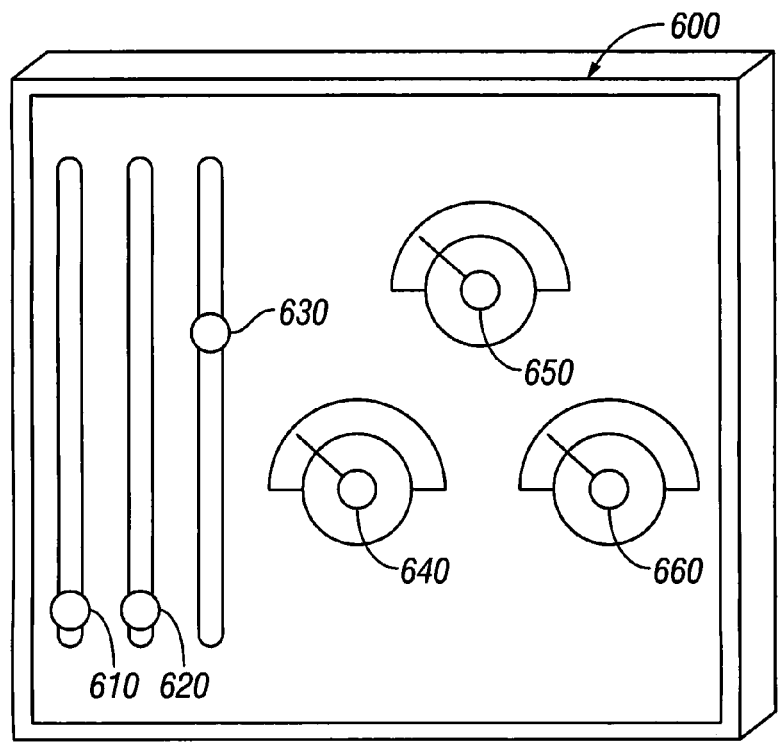
FIG. 6A is a schematic isometric representation of the front side of an LCD display interface with a plurality of interface components comprising a plurality of slider handles and a plurality of knobs according to some embodiments of the invention.

FIG. 6A is a schematic isometric representation of the front side of an LCD interface display 600 having a plurality of interface components comprising a plurality of slider handles 610, 620, and 630 and a plurality of knobs 640, 650, and 660. According to FIG. 6A, the slider handle 630 is raised to an elevated position relative to the slider starting position at which the slider handles 610 and 620 are shown.

Figure 6B:
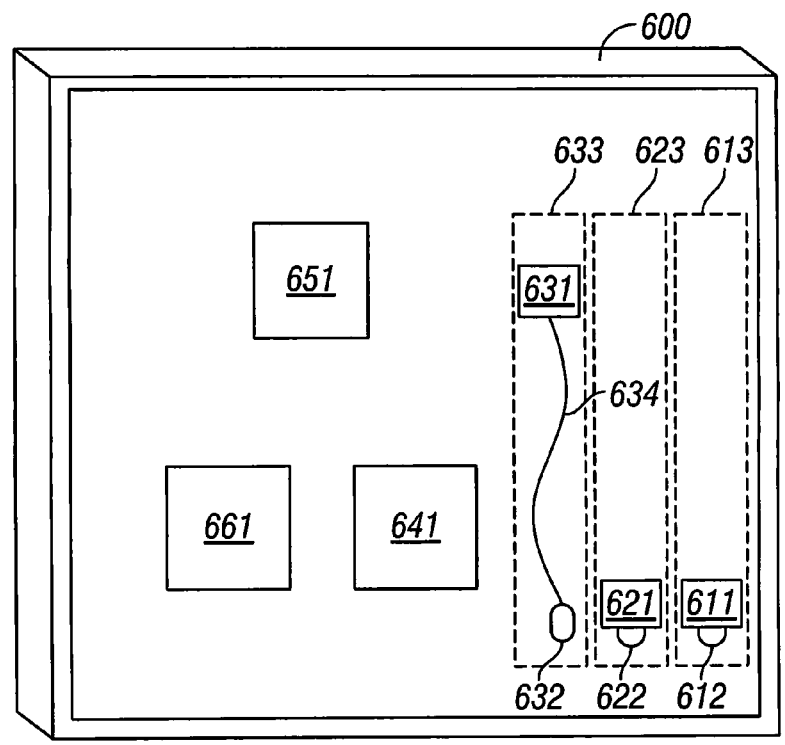
FIG. 6B is a schematic isometric representation of the back side of the LCD display interface according to some embodiments of the invention.

FIG. 6B is a schematic isometric representation of the backside of the LCD interface display 600. In some embodiments, a group of control components 611, 621, and 631 are positioned on the backside of the interface display for magnetic coupling to slider handles 610, 620 and 630 on the front side of the interface display, as desired by the user.

As shown, the backside of the interface display 600 contains the control components 611, 621, and 631, which magnetically, and/or inductively couple with the slider handles 610, 620, and 630. In some embodiments, the control components 611, 621, and 631 are the moving elements within linear encoders 613, 623, 633 (shown in phantom). According to these embodiments, the control components 611, 621, and 631 determine the position of the handles 610, 620, and 630. It will be apparent to those with ordinary skill in the relevant art having the benefit of this disclosure that various other means for determining the position of the handles 610, 620, and 630, now known or later developed can be implemented to accomplish the invention.

Spring fixtures 612, 622, and 632 are also disposed below the control components 611, 621, and 631 and couple with the control components 611, 621, and 631, respectively. The spring fixtures include springs and are configured to cause the control components 611, 612, and 613 to return to a rest position when magnetically de-coupled from the handles 610, 620, and 630. In some other embodiments gravity accomplishes returning the control components 611, 612, and 613 to their rest positions.

In some other embodiments, a group of linear encoders are configured horizontally on the back side of a display interface. The linear encoders include control components having rest positions at the left or right edge of the display interface. According to these embodiments, a user can place a handle at various vertical positions on the display interface and slide them horizontally. In other embodiments, a group of linear encoders are disposed in a grid for tracking both horizontal and vertical motion of the control component through the grid. According to these embodiments, a magnetic slider handle placed on the front side of the display interface magnetically couples with the control component. Moving the slider handle causes the control component to move through the grid. This motion is tracked by the linear encoders and serves as a two-dimensional control input.

Other Variations of Interface Component Control

In some other embodiments of the invention, users purchase specific interface components to extend the functionality of the controlled device. Each interface component is equipped with a passive RFID chip. An excitation coil behind the display provides power to the RFID chips, and the transmitted RFID is a key that identifies the interface component and unlocks the desired functionality. (That is, the controlled device is capable of the functionality upon manufacture, but the functionality is locked until an appropriate interface component is detected.) Key pairs allow a specific interface component to be programmed for use on a specific device, thus preventing the sharing or theft of interface components that extend functionality.

Preferably, an excitation coil and RFID receiver are located within or very near each control component to which an interface component can be magnetically coupled. Additionally, the transmitting antenna within the interface component preferably shapes the transmitted RFID signal such that it is only receivable by the receiver within the most proximal control component. These localization techniques allow each control component to determine the identity of the individual interface component to which it is coupled and, therefore, how the position information determined by the control component signal should be interpreted. For example, if an interface component containing an RFID indicating that it is a volume knob is attached to an encoder, the output from the encoder is used to control the volume.

In another variation of the invention, the front side of the display may be fitted with a touch sensing technology, for example a capacitive or an infrared breakbeam, that allows the position of the attached knobs to be determined directly. If combined with the RFID localization techniques, the interface displayed beneath the knobs can be adjusted automatically. For example, a "VOLUME" label and scale may be placed behind the sensed location of a knob, identifying it to the user as a volume knob.

In another variation of the invention, the advantages of reconfigurable and customizable interface components are synergistically combined with the advantages of speech recognition technology to yield extremely user friendly interfaces. For example, a media device having an LCD interface may be configured with the reconfigurable interface components and speech recognition functionality. According to these embodiments, a user declares an intended function of an interface component as the physical component is placed onto the LCD interface. The previous example is especially beneficial when the user is not presently able to look at the interface to configure the appropriate control with the desired function. Therefore, these particular embodiments particularly lend themselves to automobile interface applications.

Reconfigurable and Customizable Automobile Interface

Figure 7:
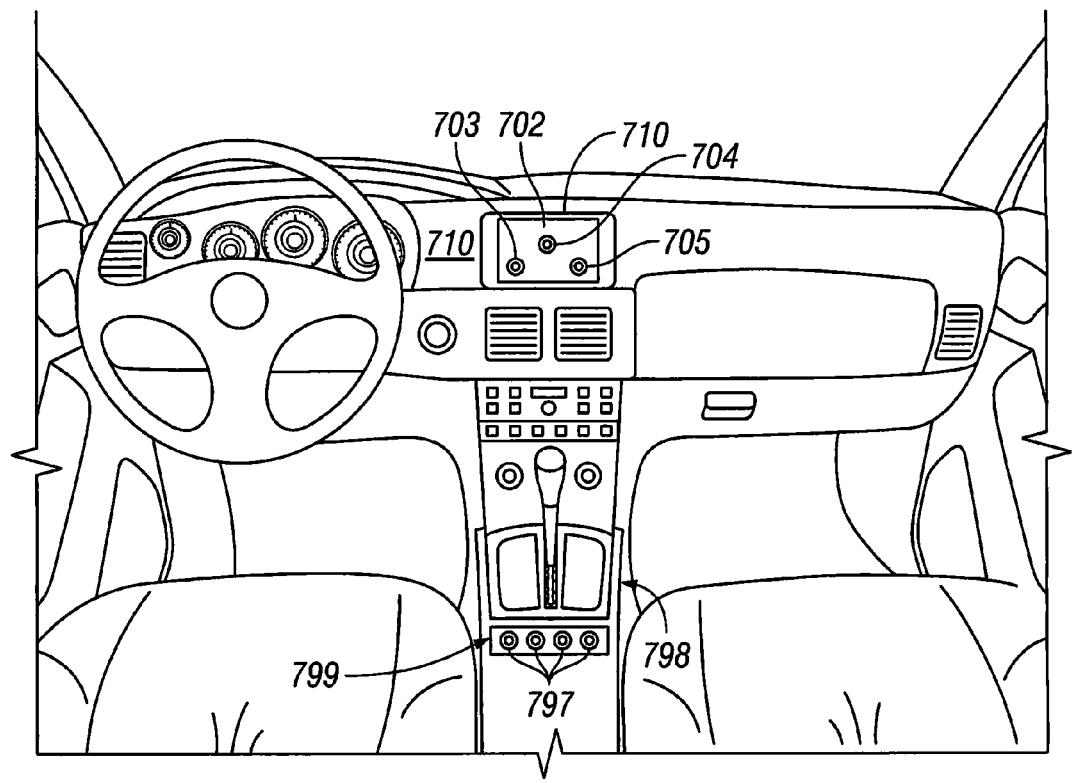
FIG. 7 is a control interface for a multimedia device with an LCD display within the dashboard of an automobile, configured to be controlled using removable, reconfigurable and customizable interface components according to some embodiments of the invention.

As explained above, it is extremely useful to implement the reconfigurable and customizable interface applications of the invention in an automobile, such that a driver can easily control a media device, a GPS device, or the like. FIG. 7 illustrates a control interface 701 for a multimedia device having an LCD interface display 702 within the dashboard 710 of an automobile, and configured to be controlled using removable, reconfigurable and customizable interface components 703, 704, and 705.

FIG. 7 also illustrates a pool 799 of knobs 797 integrated into the center console 798 of the automobile. The pool 799 of knobs 797 comprises a stash of knobs 797 that could be grabbed as new interface components are needed for the interface. According to some embodiments of the invention, the pool 799 of knobs 797 is positioned such that a driver can easily access a new knob 797 without averting his eyes from the road.

Reconfigurable Instrument Indicators

In some embodiments of the invention, changes in the attributes controlled by the interface components are communicated to and displayed on the interface display. Specifically, the control components are driven and thereby cause a magnetically coupled interface component to move, thus indicating the changed status of the attribute. In some embodiments, a knob and encoder apparatus are located on opposite sides of an interface display, as explained in FIG. 2A above, and the encoder body may be driven to adjust the rotational position of the knob. In some embodiments of the invention, the knob on the front side of the interface display is fitted with an indicator, e.g. a needle. As the encoder body on the backside of the interface display is moved, the indicator on the front side of the interface display moves therewith simultaneously. An interface display such as an LCD may be used to place an appropriate scale behind the indicator.

Customizable Appearance Themes/Skins

In some embodiments of the invention, a driver specifies characteristics such as the color, size, and font of the alphanumeric data displayed on the control panel. Notably, the font may be increased for drivers or passengers with below average visual acuity. Similarly, the shape and size of the soft controls may be specified. For convenience, predefined sets of controls may be selected as themes or skins.

Further, background images may be placed on the instrument panel in digital form, such as pictures of family, pictures of familiar places, corporate logos, and/or advertisements. Slide show functionality similar to computer screen savers can be selected. Instrument panel skins can also be offered. The invention is applicable to nearly any instrument, such as speedometers, odometers, fuel and temperature gauges, radios, and others.

Figure 8A:
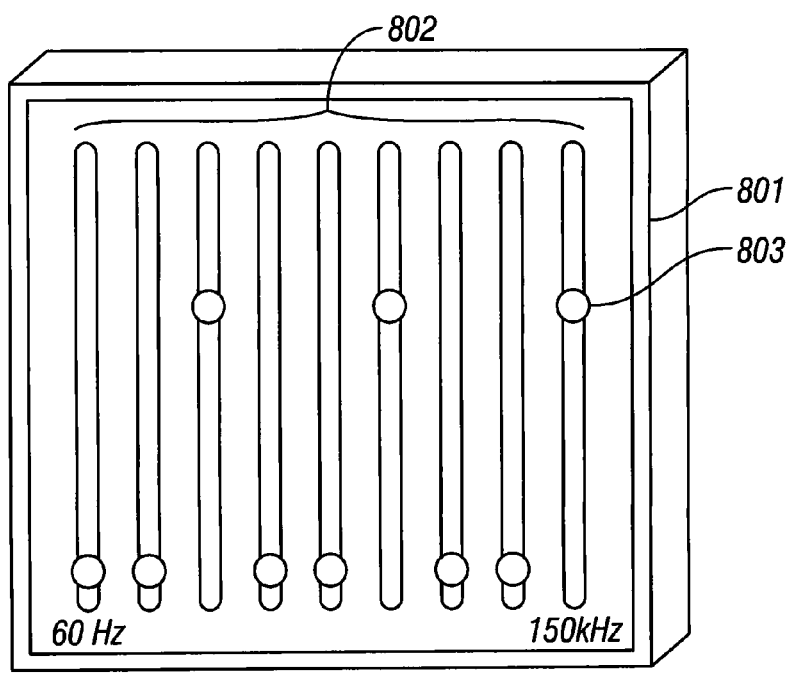
FIG. 8A is an equalizer themed skin comprising a display of various frequency response controls according to some embodiments of the invention.
Figure 8B:
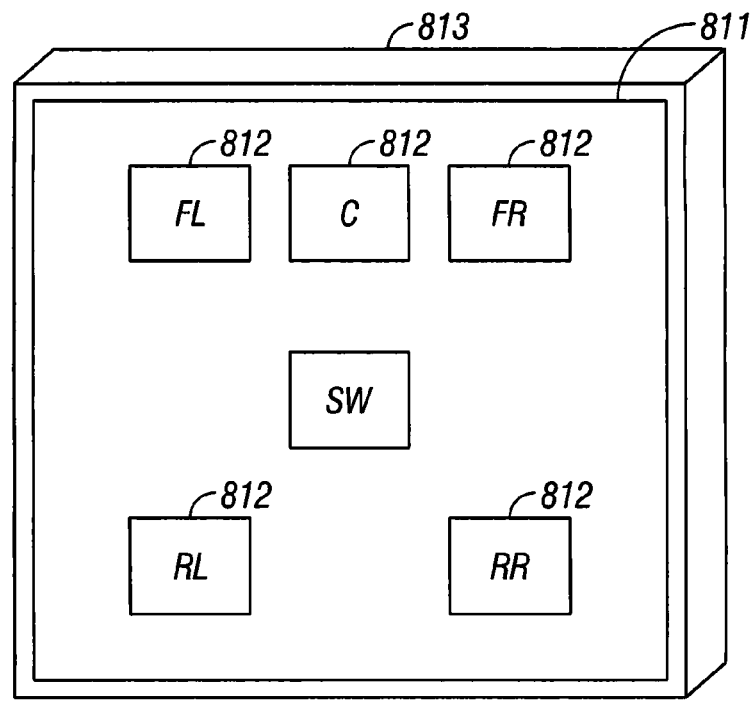
FIG. 8B illustrates a level adjustment themed skin according to some embodiments of the invention.
Figure 8C:
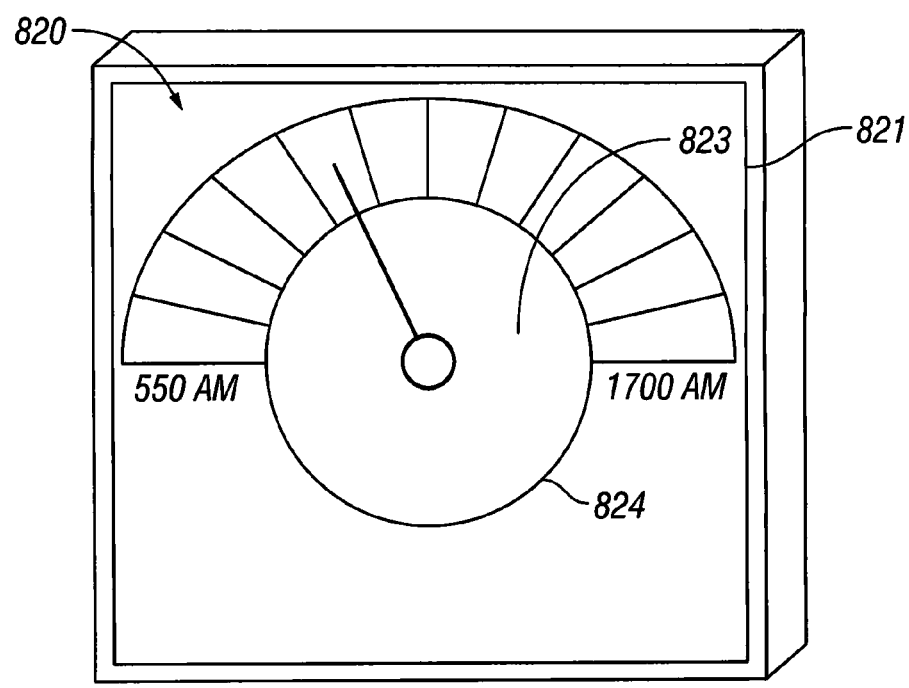
FIG. 8C illustrates a radio tuner themed skin displaying tuner information according to some embodiments of the invention.

FIGS. 8A-8C illustrate an assortment of various skins for a multimedia device interface display according to some embodiments of the invention. FIG. 8A illustrates an equalizer themed skin 801 that comprises a display of various frequency response controls 802. According to some embodiments of the invention, a removable handle 803 adjusts the gain at a particular frequency when the user magnetically couples the handle 803 to the control component (not shown) corresponding to that frequency, and slides the handle 803 to a desired position.

FIG. 8B illustrates a balance/fade themed skin 811 according to some embodiments of the invention. As shown, a number of boxes 812 are represented on an interface display 813. The boxes 812 represent various speaker outputs for an exemplary audio system, i.e. sub-woofer, front left speaker, front right speaker, center speaker, rear left speaker, and rear right speaker. According to these embodiments, a user places a knob (not shown) on an individual box 812 to adjust the relative level of an attribute, i.e. volume, for an individual speaker corresponding to that box 812.

FIG. 8C illustrates a radio tuner themed skin 821 that displays tuner information 820, such as a current radio station setting, and that also displays a virtual level dial 823 which indicates the determined position of an interface component 824.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. An instrument control apparatus comprising:
   an interface surface that is used to interface with at least one electronic application;
   at least one removable interface component coupled to the interface surface, wherein at least a portion of the at least one removable interface component is movable; and
   at least one control component electronically coupled to the at least one electronic application and configured to control at least one function of the electronic application;
   wherein the at least one removable interface component is magnetically or inductively coupled to the at least one control component through the interface surface; and
   wherein the at least one function of the electronic application is controlled responsive to manipulation of the moveable portion of the at least one interface component.

2. The instrument control apparatus of claim 1, wherein the interface surface comprises a liquid crystal display (LCD).

3. The instrument control apparatus of claim 1, wherein the interface surface is configured to display content relating to at least one function of the electronic application.

4. The instrument control apparatus of claim 1, wherein the electronic application comprises a stereo receiver coupled to an audio output.

5. The instrument control apparatus of claim 1, wherein the electronic application comprises an audiovisual receiver coupled to an audio output, wherein the interface surface comprises a liquid crystal display (LCD), and wherein the LCD is configured as a video output.

6. The instrument control apparatus of claim 1, wherein the electronic application comprises a Global Positioning System (GPS) apparatus.

7. The instrument control apparatus of claim 1, wherein the at least one interface component further comprises:
   a component body having a turning knob with an inner cavity; and
   one or more component magnets disposed within the inner cavity;
   wherein the at least one control component also includes an encoder comprising:
      an encoder body having an encoder cavity;
      one or more encoder magnets disposed within the encoder body, wherein the one or more component magnets are magnetically coupled with the one or more encoder magnets through the interface surface; and a means for communicating encoder data to a processor, wherein the processor translates the encoder data into control data indicating how the component body was manipulated, wherein at least one function of the application is controlled by the control data.

8. The instrument control apparatus of claim 1, wherein motion of at least one removable interface component inductively powers at least one control component.

9. The instrument control apparatus of claim 1, wherein the at least one control component is coupled to at least one output.

10. The instrument control apparatus of claim 1, wherein at least one removable interface component includes an antenna for emitting a unique radio frequency identification;
   wherein at least one control component includes a receiver and a means for recognizing a radio frequency identification such that a control component is configured to identify a particular interface component based on the recognized radio frequency identification; and
   wherein the function of the at least one removable interface component is determined by its unique radio frequency identification.

11. The instrument control apparatus of claim 1, wherein the at least one control component comprises a plurality of control components, and wherein the plurality of control components is arranged in a grid pattern.

12. The instrument control apparatus of claim 11, wherein the interface surface is configured to display a representation of a grid to indicate a position of each of the plurality of control components such that a user is able to place the at least one removable interface component in an appropriate location upon the grid.

13. The instrument control apparatus of claim 1, wherein at least one removable interface component comprises a push button component.

14. The instrument control apparatus of claim 1, wherein at least one removable interface component comprises a slider component.

15. The instrument control apparatus of claim 1, further comprising:
   means for returning each of the at least one control component to a predetermined resting position upon decoupling the removable interface component from the interface surface.

16. The instrument control apparatus of claim 1, further comprising a processor for controlling the electronic application and a memory, wherein the memory stores one or more function templates for display on the interface surface, the function template comprising a means for presenting where removable interface components are meant to be placed upon the interface surface and a means for presenting a default function of the removable interface components.

17. The instrument control apparatus of claim 1, further comprising a protective film disposed on the interface surface, such that the at least one removable interface component does not damage the interface surface upon coupling with the interface surface or upon movement over the interface surface.

18. The instrument control apparatus of claim 1, wherein the interface surface is disposed within a dashboard of an automobile and wherein the at least one control component is positioned behind the interface surface, wherein a driver couples the at least one interface component to the interface surface to manipulate at least one electronic application of the automobile.

19. A method of controlling a device with reconfigurable interface components comprising:
   providing a control panel with a first surface and a second surface;
   coupling at least one control component to the second surface, wherein the at least one control component controls the device;
   removably coupling at least one interface component to the first surface, wherein at least a portion of the at least one removable interface component is movable, and wherein the at least one interface component is magnetically or inductively coupled to the at least one control component through the control panel; and
   manipulating the at least one control component through movement of the movable portion of the at least one interface component, thereby controlling the device.

20. The method of claim 19, further comprising:
   displaying information relating to the function of the at least one control component on the first surface.

21. The method of claim 19, wherein the at least one control component comprises an optical encoder, the method further comprising:
   creating a field of electromagnetic radiation around the at least one interface component;
   providing an inductive means within the at least one control component;
   moving the at least one interface component, thereby inducing a voltage in the at least one control component; and
   powering the control component using the voltage.

22. The method of claim 19, wherein the at least one control component comprises a linear encoder with a moving magnetic control means, wherein the at least one interface component comprises a magnetic slider handle, the method further comprising:
   removably coupling the magnetic slider handle with the magnetic control means through the interface surface;
   sliding the slider handle, thereby causing the magnetic control means to move within the linear encoder;
   determining the position of the magnetic control means within the linear encoder, thereby forming positional data; and
   controlling the device using the positional data.

\* \* \* \* \*